United States Patent [19]
Yamamoto et al.

[11] Patent Number: 5,260,720
[45] Date of Patent: Nov. 9, 1993

[54] IMAGE FORMATION SYSTEM

[75] Inventors: Yoichi Yamamoto, Nara; Masao Narumiya, Shiki, both of Japan; Frederic J. Kahn, Paloalto, Calif.

[73] Assignee: Sharp Kabushiki Kaisha, Osaka, Japan

[21] Appl. No.: 675,306

[22] Filed: Mar. 26, 1991

[30] Foreign Application Priority Data

Mar. 28, 1990 [JP] Japan .................. 2-79955

[51] Int. Cl.⁵ .............................. H04N 1/21
[52] U.S. Cl. .................................... 346/108
[58] Field of Search ............ 346/108, 107 R, 160; 355/32, 27; 359/70, 43, 44, 45

[56] References Cited

U.S. PATENT DOCUMENTS 4,733,275  3/1988  Sugiura et al. ............... 358/300
5,001,574  3/1991  Shimizu et al. ............... 358/448
5,066,107  11/1991 Yoshinaga et al. ............ 359/43
5,085,498  2/1992  Yamamoto et al. ............ 359/70

Primary Examiner—Mark J. Reinhart
Attorney, Agent, or Firm—David G. Conlin; Robert F. O'Connell

[57] ABSTRACT

An image formation system includes an image data outputting device for outputting three-primary-color image data for forming a full color image, and a printer selectively writing the image data from the image data outputting device in an optical image memory by beam light for printing the image out on a recording medium, the printer including, a specifying device for specifying an arrangement of images written in the optical image memory, and a writing device dividing the single optical image memory into sections corresponding to the specified arrangement, for writing primary color images into the sections, the optical image memory being a memory where a stored image is optically recognizable and can be repetitively read out.

4 Claims, 10 Drawing Sheets

In the Case of FIG. 1(C)

Shutter

Filter Switching

X-direction Linear Motor

R.G.B. Image
X-direction Center Position Signal $S_{26}$
Y-direction Linear Motor R Image
Y-direction Center Position Signal $S_{27}$
G Image
Y-direction Center Position Signal $S_{28}$
B Image
Y-direction Center Position Signal $S_{29}$
X-direction Linear Motor
Original Point Signal $S_{30}$
Y-direction Linear Motor
Original Point Signal $S_{31}$
Exposure Completion Signal $S_{32}$

IMAGE FORMATION SYSTEM

BACKGROUND OF THE INVENTION

I. Field of the Invention

The present invention relates to an image formation system for printing an image written in a liquid crystal cell by laser light modulated by image data.

II. Description of the Prior Art

U.S. Pat. No. 3,796,999 discloses a display selectively irradiating laser light to liquid crystal cells for displaying an image in liquid crystal. In an aspect of the invention, heat of the laser light is utilized to partially change a phase of the liquid crystal; the image is formed in correspondence with an irradiation pattern of the laser light. The liquid crystal cell employed herein is, for example, a smectic liquid crystal.

Also, Japanese Unexamined Patent Publication No. 20773/1989 discloses a device for forming an image using the above-mentioned thermal writing liquid crystal cell. According to the invention, irradiating a light transmitted or reflected by a liquid crystal cell to photosensitive material, a latent image is formed on the photosensitive material, and an image can be formed based upon the latent image. The device includes three of the liquid crystal cells in which primary-color-images of R(red), G(green) and B(blue) are written, respectively; from the three images a composite full color image is formed.

With such conventional image formation devices, however, upon an image writing in a liquid crystal cell, a single-primary-color image is written in a single liquid crystal cell; therefore, there arises the problem that the total time required for the writing is extended.

SUMMARY OF THE INVENTION

The present invention provides an image formation system comprising image data outputting means for outputting three-primary-color image data for forming a full color image and a printer selectively writing the image data from the image data outputting means in an optical image memory by beam light for printing the image out on a recording medium, the printer including specifying means for specifying an arrangement of images written in the optical image memory and writing means dividing the single optical image memory into sections corresponding to the specified arrangement, for writing primary color images into the sections, the optical image memory being a memory where a stored image is optically recognizable and can be repetitively read out.

Preferably, the writing means comprises a mirror directing beam light for reciprocally scanning the optical image memory and a shift mechanism for shifting the optical image memory in a direction perpendicular to a direction of the scanning.

Preferably, the specifying means specifies an arrangement of a plurality of primary-color-images in a direction of the scanning.

Preferably, the specifying means specifies an arrangement of a plurality of primary-color-images in a direction perpendicular to the direction of the scanning by the mirror.

The optical image memory may store an image which is recognizable when a light is irradiated and which can be read out any time in the identical state with repetitive irradiations (unless erasing is carried out). For example, it may include that which uses liquid crystal, electro chromic, PLZT (a compound of Pb, La, Zr and Ti), etc. and is identified with an ordinary photoconductor drum in a copying machine.

Preferably, the optical image memory may be a liquid crystal cell utilizing liquid crystal assuming a smectic C Phase, or nematic-cholesteric mixed liquid crystal. A configuration of the liquid crystal cell may be that which has liquid crystal overlaid with a heat accumulating layer (see U.S. Pat. No. 3,796,999, for example) or that which has an optical writing-type device including a photoconductive layer (see Japanese Unexamined Patent Publication No. 10036/1974 and Japanese Unexamined Patent Publication No. 10037/1974). The liquid crystal cell may be either a reflection type cell or a transmission type cell. The optical image memory can retain an image once stored for several hours to several tens of days even if it is left as it is.

As the beam light for writing the optical image memory, laser beam of a laser diode, light of an LED, etc. may be used; otherwise, that which can irradiate an image area of the optical image memory in correspondence with desired image data through scanning, total face irradiation and the like may be used.

When an arrangement of images are specified by the specifying means, the writing means writes a plurality of primary-color-images in a single optical image memory corresponding to the specified arrangement; hence, the writing operation of the writing means can be simplified and performed at higher speed than ever.

DETAILED DESCRIPTION OF THE PREFERRED EMBODIMENTS

Figure 4:
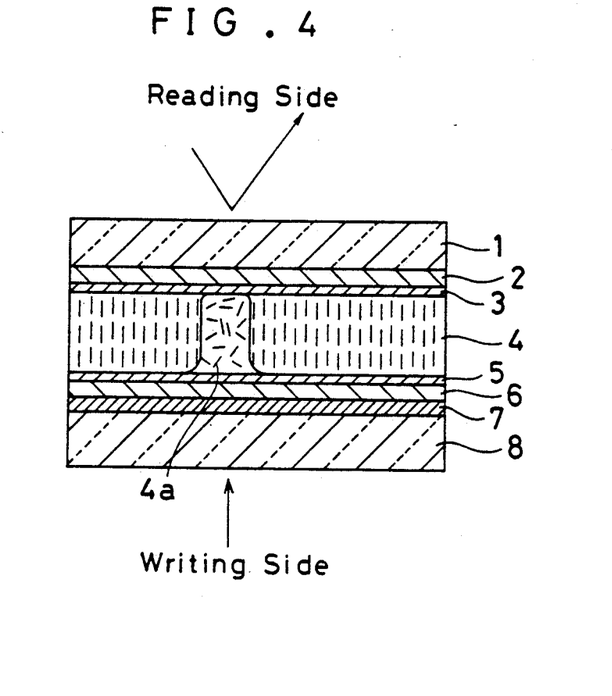
FIG. 4 is a sectional view showing the liquid crystal cells.

FIG. 4 shows a configuration of a section of liquid crystal cells in which image data is written by laser light. The liquid crystal cells have a writing side at the bottom in FIG. 4 and a reading side at the top and include a glass substrate 1, a transparent electrode 2, a registration layer 3, a liquid crystal layer 4, a registration layer 5, a reflective layer serving as an electrode 6, a heat absorbing layer 7 and a glass substrate 8 from the top to the bottom. As for liquid crystal, a smectic liquid crystal is used which is transparent in the ordinary state. When a laser light is irradiated from the bottom side of the liquid crystal cells, the heat absorbing layer 7 absorbs it and generates heat; and accordingly, the liquid crystal layer 4 is suffered from a phase change (4a). Because of the phase change, that part becomes cloudy; therefore, when light is irradiated from the top side, the light is absorbed or scattered. On the other hand, in a part which is not cloudy, the light is transmitted by the liquid crystal layer 4 and reflected by the reflective layer serving as an electrode 6. Thus, there arises a contrast of light between the parts transparent and cloudy, and it is read out as an image. In erasing the image, voltage may be applied between the transparent electrode 2 and the reflective layer serving as an electrode 6.

Figure 5:
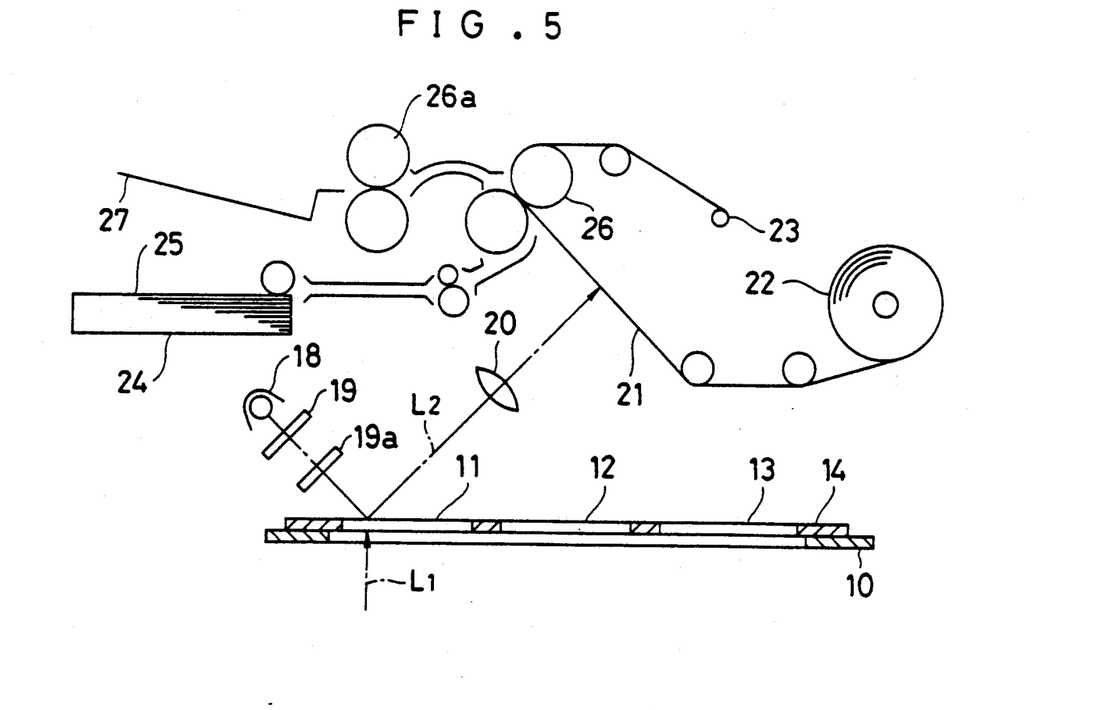
FIG. 5 is a diagram for explaining a configuration of a major portion of a printer.
Figure 6:
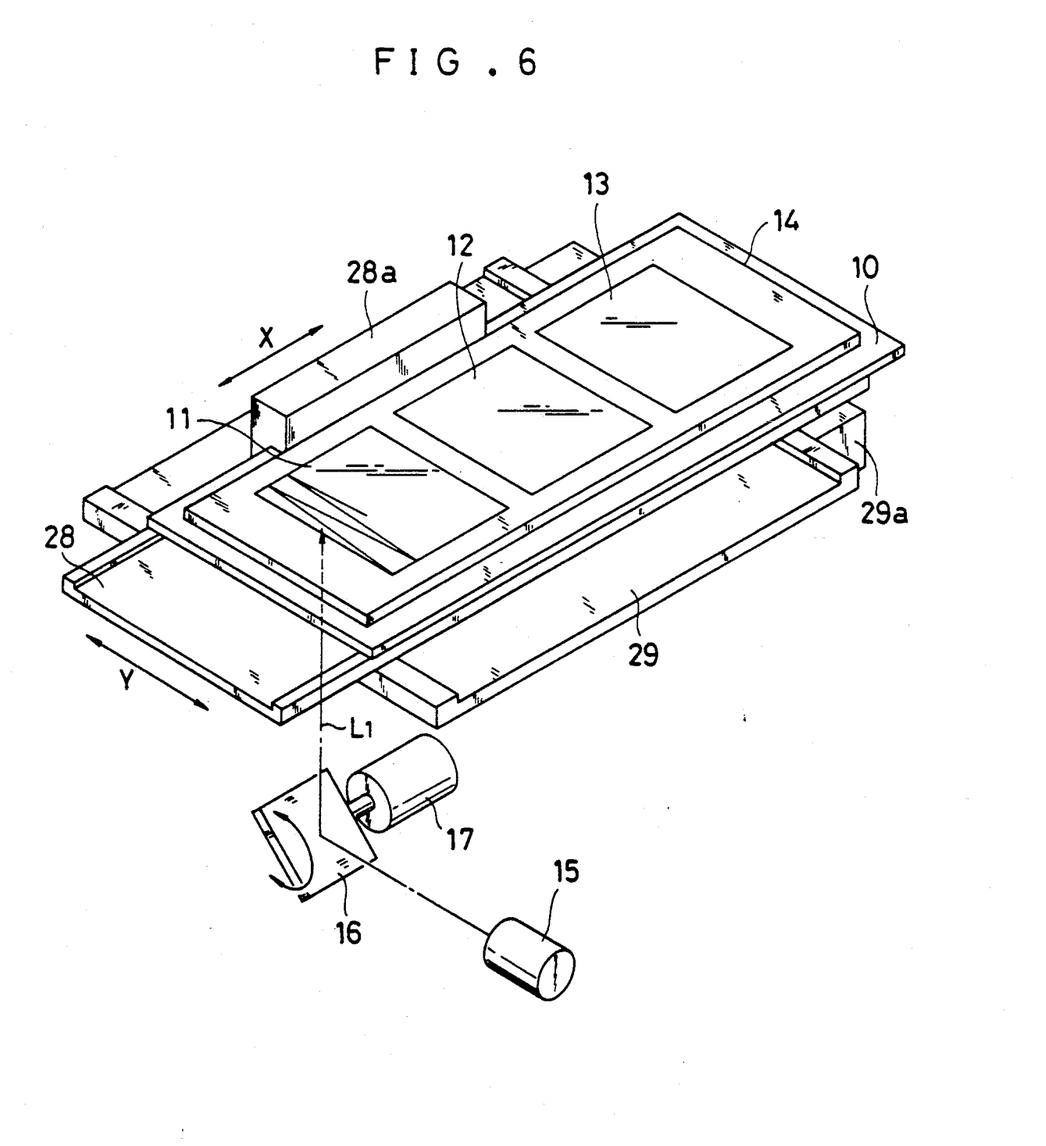
FIG. 6 is a perspective view showing a major portion of FIG. 5.
Figure 7:
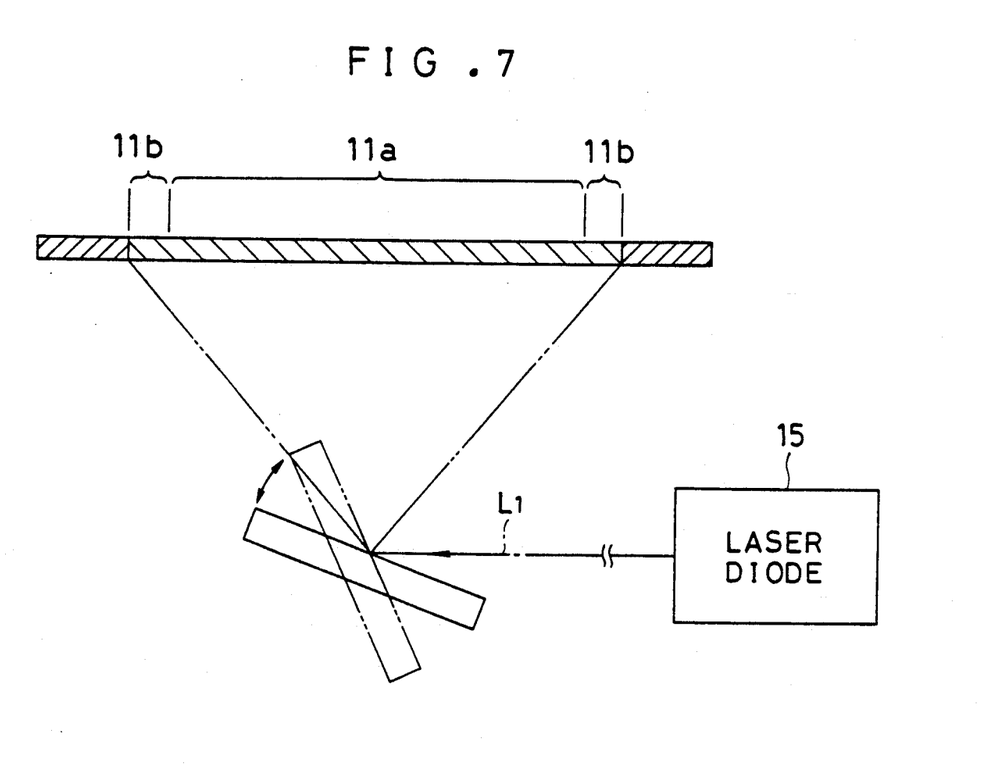
FIG. 7 is a sectional side view showing a major portion of FIG. 6.
Figure 8:
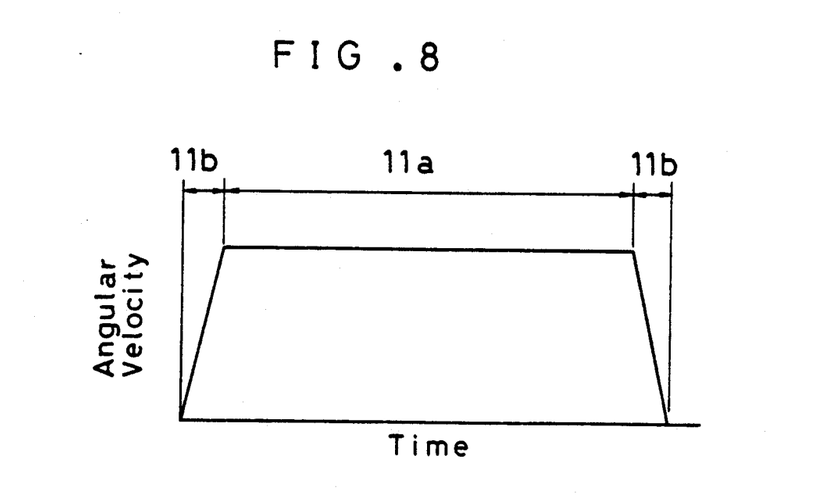
FIG. 8 is a diagram for showing a pivoting speed of a mirror upon the image writing.

FIGS. 5 through 7 show configurations of major portions of a full color printer employing the above-mentioned liquid crystal cells. Three of the liquid crystal cells 11, 12 and 13 are attached to a frame 14 and supported by a liquid crystal supporting portion 10. The liquid crystal supporting portion 10 is supported by an X-axis direction shift mechanism 28 and a Y-axis direction shift mechanism 29 and is movable in X-axis and Y-axis directions shown by arrows, respectively; the movement in both the directions is correctly performed by linear encoder motors (linear motors to which linear encoders are connected) 28a, 29a. The Y-axis direction is identical with a direction of a scanning ray of a laser light L1 mentioned below. Under the liquid crystal supporting portion 10, a writing device including a laser diode 15, mirror 16 and rotary encoder motor (a motor to which a rotary encoder is connected) 17 are placed. FIG. 7 shows a cross-section of a liquid crystal cell seen from the left side; the mirror 16 is reciprocally pivoted by the motor 17 (FIG. 6) between solid and dash-two-dot lines. In this way, the laser light L1 from the laser diode performs a line scanning of the liquid crystal cell 11 and makes an image in an image formation area 11a. Opposite ends of the image formation area 11a are approach-run and over-run areas. As shown in FIG. 8, when the mirror 16 is reciprocally pivoted, the speed of the mirror becomes lower at the beginning of the pivotal movement and for a halt (when it makes a U-turn). For the reason, the approach-run and over-run areas are provided in the opposite ends of the image formation area 11a. In writing an image, when the mirror 16 is reciprocally pivoted moving the liquid crystal supporting portion 10 in the X-axis direction, the liquid crystal cell 11 is, referring to FIG. 6, scanned by a laser light in the Y-axis direction as shown by an arrow and the image is written in the liquid crystal cell 11.

As shown in FIG. 5, above the liquid crystal supporting portion 10, a reading device including a light source lamp 18, a color separating filter 19, a shutter 19a and a lens 20 is placed. The light source lamp 18 is, for example, a halogen lamp; each time the liquid crystal supporting portion 10 is moved in the X-axis direction and liquid crystal cells reach predetermined positions, the shutter 19a opens to perform a face scanning to the liquid crystal cells 11 through 13; a light L2 reflected by the liquid crystal cells 11 through 13 is guided through a lens 20 to a photoconductive body 21. In the liquid crystal cells 11 through 13, images of R(red), G(green) and B(blue) are written in advance. The color separating filter 19 selectively transmits merely specified color lights; there are three types of color filter: an R filter transmitting a red wavelength, a G filter transmitting a green wavelength, and a B filter transmitting a blue wavelength. The filter 19 is switched among the filter transmitting the red wavelength in reading the liquid crystal cell where an R image is written, the filter transmitting the green wavelength in reading the liquid crystal cell where a G image is written, and the filter transmitting the blue wavelength in reading the liquid crystal cell where a B image is written.

The R, G and B filters are attached to a disc rotated by a motor not shown; a specified filter can be set on an optical axis of the lamp 18 by slits graved in the disc. In the initial state, the R filter is set on the optical axis of the lamp 18. The shutter 19a is made of a disc with an opening which is rotated by a motor not shown; open and close of the shutter 19a are detected by slits graved in the disc.

The photoconductive body 21 may be, for example, a full color type photosensitive and pressure sensitive sheet disclosed in Japanese Unexamined Patent Publication No. 30537/1984, which is coated with three kinds of micro capsules uniformly dispersed: (1) micro capsules loaded with a photo-hardening material sensitive to a red light and dye developing cyanogen, (2) micro capsules loaded with a photo-hardening material sensitive to a green light and dye developing Magenta and (3) micro capsules loaded with a photo-hardening material sensitive to a blue light and dye developing yellow. The photosensitive and pressure sensitive sheet makes a roll wound around a supply axis 22 and is sent from the supply axis 22 to a take-up axis 23 when an image is formed. While being sent, the sheet is exposed to specific color lights through the color separating filter 19 and the liquid crystal cells 11 through 13. The reflected lights of the R, G and B images of the liquid crystal cells are projected overlapped with a corresponding part of the photosensitive material 21. Thus, on the photosensitive material 21, the above-mentioned micro capsules (1)–(3) are hardened on the same plane; consequently, a full color latent image is formed. To the latent image, an image receiving sheet 25 held in a sheet cassette 24 is supplied; both the sheets are pressed by a pressing roller 26, overlaid with each other. In this way, the micro capsules to which light is not directed (which correspond to an area where the liquid crystal becomes cloudy) are broken, and the dye is discharged to make an image on the image receiving sheet 25. In general, the image receiving sheet 25 is coated with developer for making the dye loaded in the micro capsules develop color, but the photoconductive body 21 may be impregnated with the developer (Japanese Unexamined Patent Publication No. 88739/1983). In this way, a printing is performed. The image receiving sheet 25 having the image formed is subjected to a heat treatment with a heating roller 26a; thereafter, it is discharged into a paper tray 27.

Figure 1:
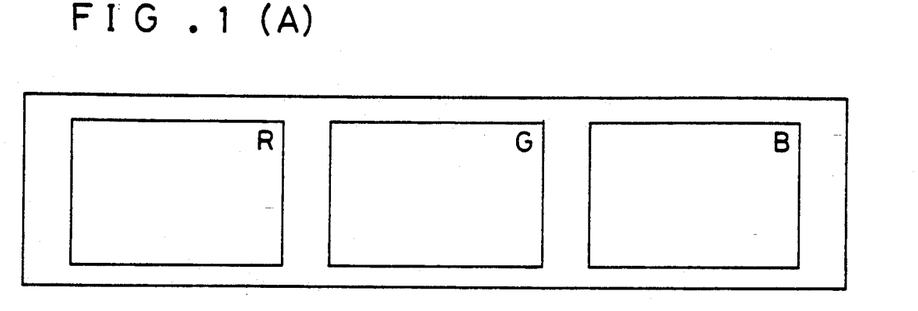
FIGS. 1(A) through 1(D) are plan views showing exemplary patterns of image writing to liquid crystal cells.

Now, patterns according to which images are written in the liquid crystal cells according to the present invention will be explained. FIG. 1 is a diagram showing an example of the writing pattern; FIG. 1(A) shows a state in which R, G and B images are written in the three liquid crystal cells 11 through 13, respectively, to make a full color image of A4 size on the image receiving sheet 25.

On the other hand, FIGS. 1(B), 1(C) and 1(D) show states in which all of the R, G and B images are written in a single liquid crystal cell; in FIG. 1(B), three of the images are arranged in the X-axis direction; in FIG. 1(C), three of the images are arranged in the Y-axis direction; and in FIG. 1(D), three of the images are arranged in both the X-axis and Y-axis directions. In this embodiment, writing patterns in FIGS. 1(A) through 1(C) are arbitrarily chosen.

Figure 2:
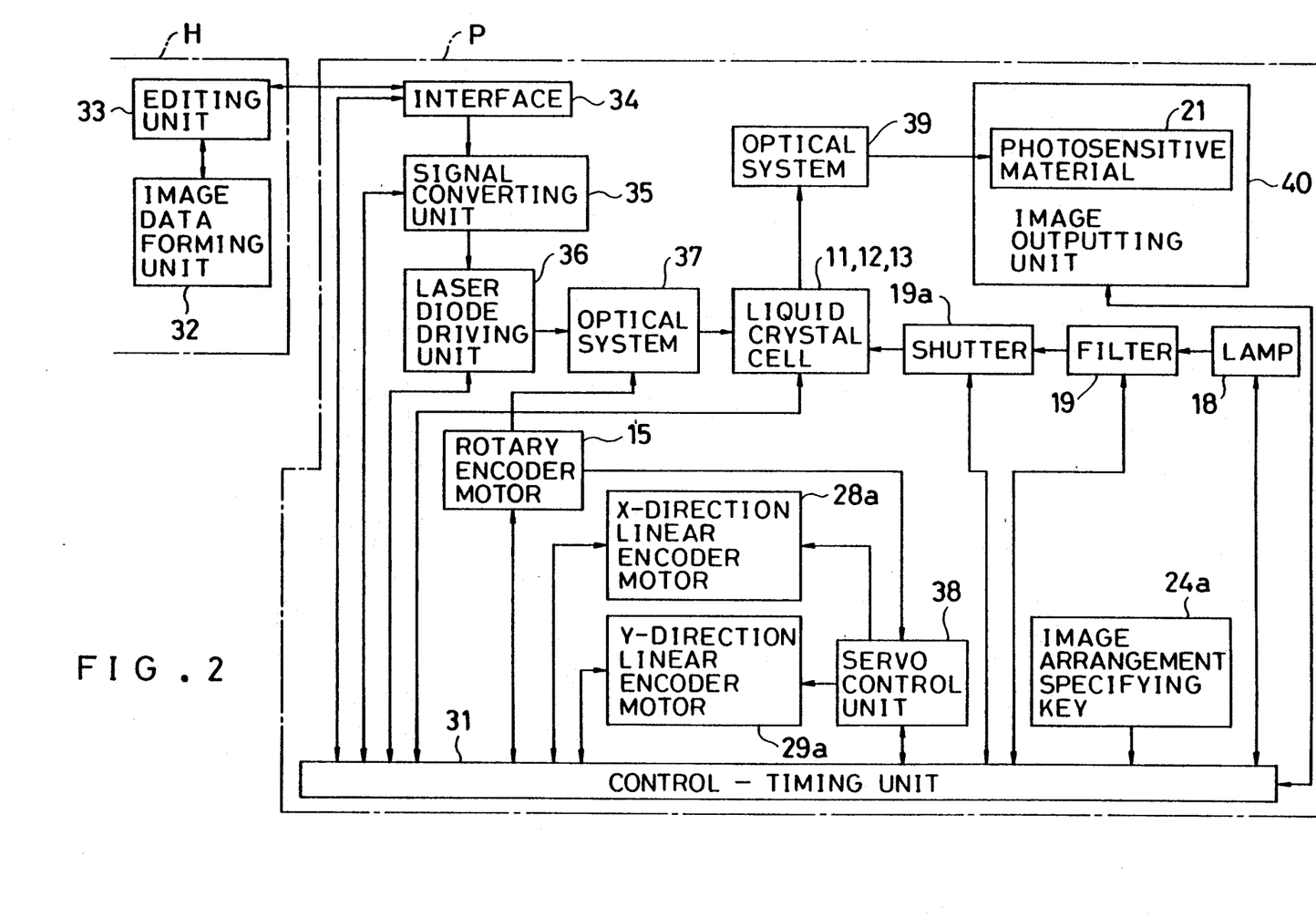
FIG. 2 is a block diagram showing a system of an embodiment according to the present invention.

FIG. 2 is a block diagram showing the image formation system. In FIG. 2, the image formation system is composed of a host computer H as an image data formation device and a printer P; components of the printer P are controlled by a control/timing unit 31. The control/timing unit 31 receives an input signal from an operation unit (not shown) of the printer P, an input signal from an image arrangement specifying key 24a and position detecting data from the rotary encoder motor 15 and linear encoder motors 28a, 29a to make its components operate.

The image arrangement specifying key 24a is a key switch for specifying an image pattern to be written in the liquid crystal cell among the patterns of FIGS. 1(A), 1(B) and 1(C).

The host computer H comprises an image data formation unit 32 and an editing unit 33 for editing image data. The image data of 8 bit outputted from the editing unit 33 is inputted through an interface 34 to a signal converting unit 35. The signal converting unit 35 has the image data D/A converted and outputs it at a timing specified by the control/timing unit 31. A laser diode driving unit 36 makes the image data modulate and drive the laser diode 15. An optical system 37 guides a laser light from the laser diode 15 to the liquid crystal cells 11, 12 and 13 by the mirror 16; an optical system 39 images the light L2 reflected by the liquid crystal cell 11, 12 and 13 which are exposed to a light of the lamp 18, through a lens 10 on the photoconductive body 21; an image outputting unit 40 sends and supplies the photosensitive body 21 and image receiving sheet 25, presses both of them, and thereafter subjected them to a heat treatment to output. A servo control unit 38 receives an output from the control/timing unit 31 in writing the image in the liquid crystal cell, drives the linear encode motor 28a and moves the liquid crystal cells in the X-axis direction.

When the images written as in FIGS. 1(A) and 1(B) are exposed, the liquid crystal cells are moved in the X-axis direction by the linear encoder motor 28a to put the center of the images on the liquid crystal cells in a common point with the center of a position where an image is to be formed on the photoconductive body 21. Moreover, when the image written as in FIG. 1(C) is exposed, the liquid crystal cells are moved in the X-axis and Y-axis directions by the linear encoder motors 28a, 29a to put the center of the images written in the liquid crystal cells in a common point with the center of a position where an image is to be formed on the photoconductive body 21.

Figure 3:
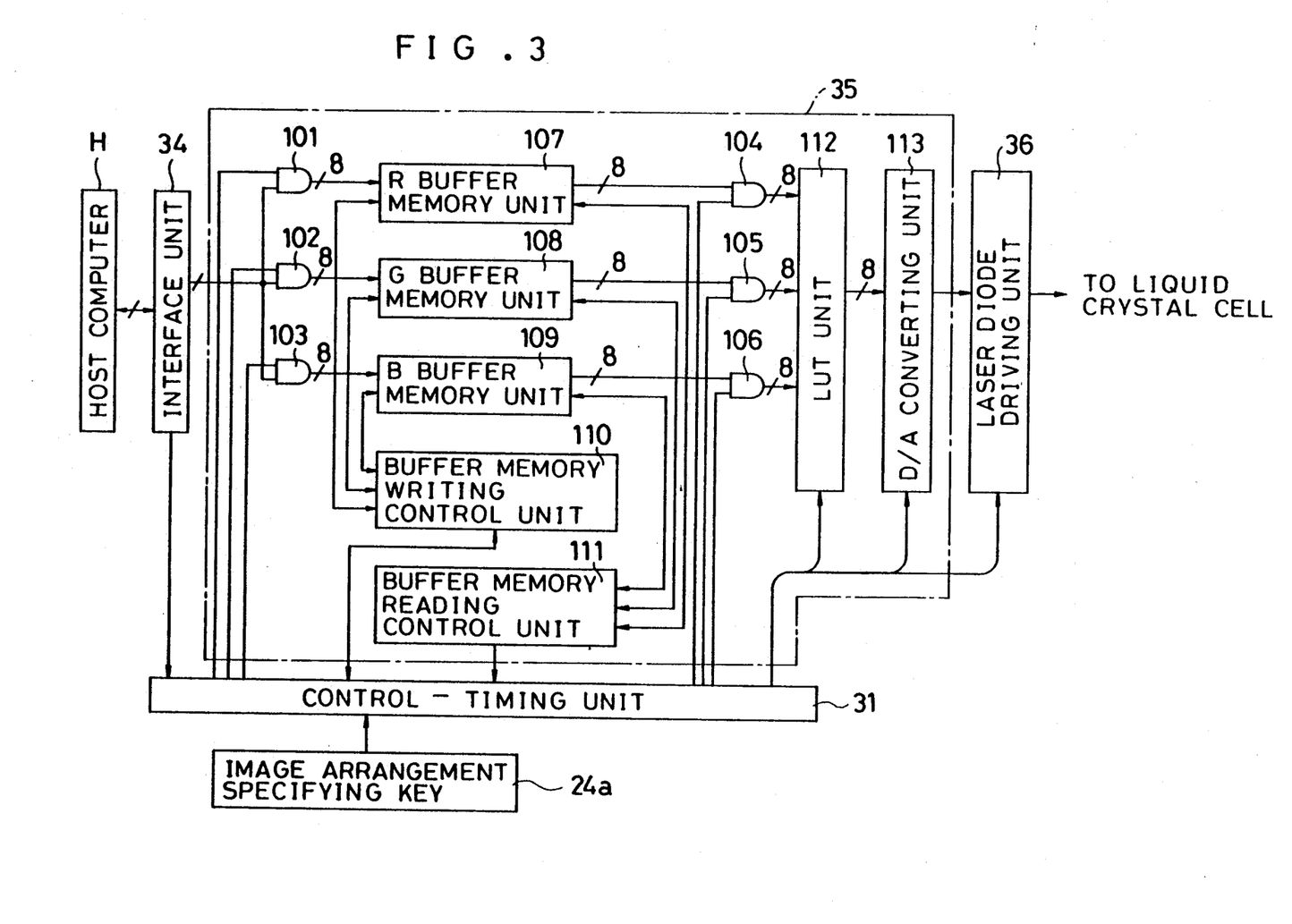
FIG. 3 is a block diagram showing a major portion of FIG. 2 in detail.

FIG. 3 is a detailed block diagram showing the signal converting unit of FIG. 2. Gates 101-103 sort image data (8 bit) inputted from the interface unit 34 into the R, G and B image data; buffer memory units 107-109 write the sorted R, G and B image data, respectively. Reference numeral 110 denotes a buffer memory writing control unit. A buffer memory reading control unit 111 controls an image density corresponding to the image arrangement inputted from the image arrangement specifying key 24a when the image data is read out from the buffer memory 107-108; gates 104-106 receives an output from the control timing unit 31 to read the image data from the R, G and B buffer memory units 107-109. An LUT unit 112 comprises conversion tables of respective colors for the photoconductive body 21 to re-create the precise colors, and it converts the inputted image data and outputs it. The image data outputted from the LUT unit 112 is D/A converted by a D/A converting unit 113, current-amplified in the laser diode driving unit 36, and makes the laser diode 15 emit light.

A transmission order of the image data (8 bit) transmitted from the host computer H to the printer P is determined by a data processing speed and a processing method of the printer P. For example, the image arrangement is as in FIG. 1(A) or 1(B), in the writing on the liquid crystal cells by a laser light, an order of outputting the image data is reversed in odd-numbered scanning lines to even-numbered scanning lines; hence, in order to cope with it, the image data from the host computer H is edited in the editing unit 33 in advance and then transferred to the printer P. When the image arrangement is as in FIG. 1(C), inputted to the printer P is a line of R image data, a line of G image data, a line of B image data, a line of B image data (reverse direction), a line of G image data (reverse direction), a line of R image data (reverse direction), . . . , and so forth.

The control/timing unit 31 estimates an order and amount of the image data inputted from the host computer h based upon the image arrangement inputted from the image arrangement specifying key 24a to make any of the R, G and B buffer memory units 107-109 store the image data outputted by the interface unit 34.

The R, G and B buffer memory units 107-109 requires a storage capacity sufficient to registrate a speed of transmission of the image data of the host computer H with a speed of processing the image data of the printer P. For example, with dual port memories of 32 Kbyte (32×8 bit), the writing of the image data from the host computer H and the reading out to the LUT unit 112 are performed at the same time.

A rotation angle signal (encoder output) of the rotary encoder motor 17 is a signal of 19 bit, while position signals of the linear encoder motors 28a, 29a are signals of 20 bit. The control/timing unit 31 estimates a spot position of a laser light scanning the liquid crystal cells from these signals to determine a timing of the image data reading of the R, G and B buffer memory units 107-109. The buffer memory reading control unit 111 thins out or insert the image data by controlling an address and clock of the image data of the R, G and B buffer memory units 107-109 when it is read out, so as to perform a so-called electronic zooming. In this way, an image inputted from the host computer H is scaled down or enlarged corresponding to the specified image arrangement. The scaling-down/enlarging processing may be performed in the host computer H in advance.

Figure 9:
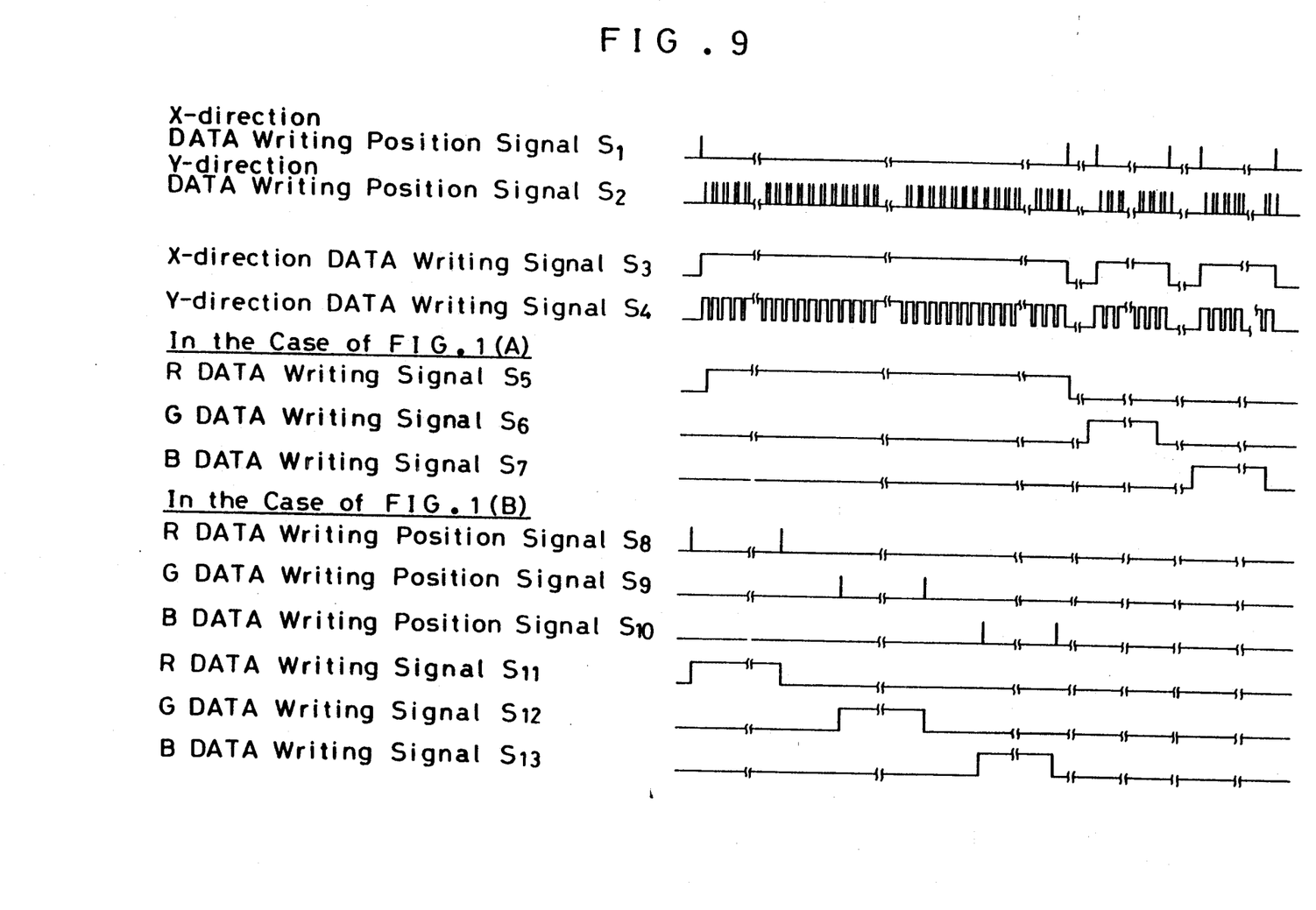
FIGS. 9 and 10 are timing charts showing the operation of the image writing to the liquid crystal cells.
Figure 10:
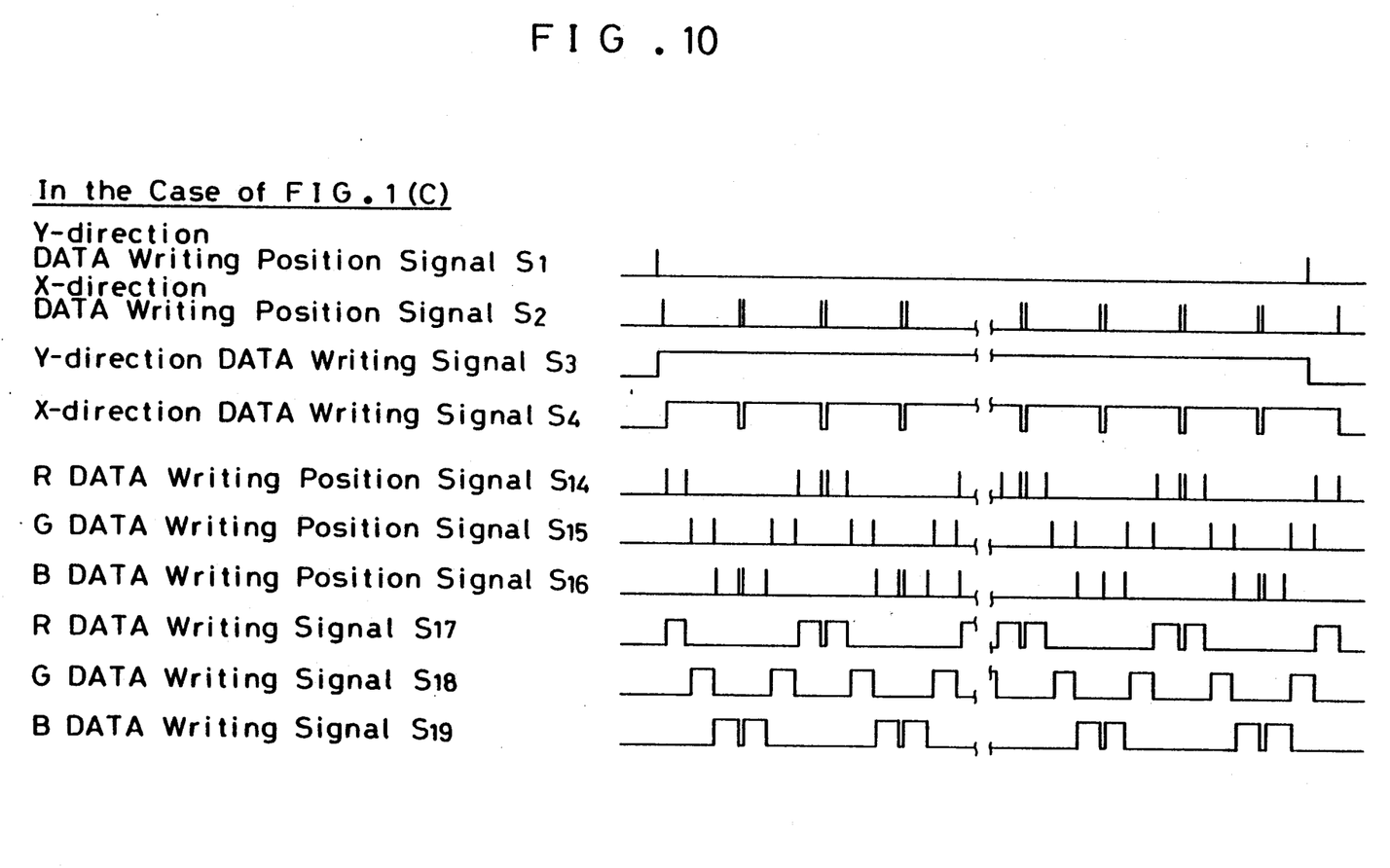

FIGS. 9 and 10 are timing charts for explaining the operation of the image writing to the liquid crystal cells by a laser light. In FIGS. 9 and 10, reference symbol S1 denotes an X-axis direction data writing position signal outputted when an encoder output of the linear encoder 28a reaches a predetermined value. The encoder of the linear encode motor 28a outputs an original-point signal and a counter output of 20 bit expressing a current position; when the liquid crystal cells are moved in the X-axis direction by the linear encoder motor 28a, the signal S1 is outputted each time the three liquid crystal cells reach start and end positions of writing. The encoder of the rotary encoder motor 15 outputs an original-point signal and a counter output of 19 bit expressing a current position; a Y-axis direction data writing position signal S2 is outputted when an encoder output of the rotary encoder motor 15 reaches a predetermined value, or when a laser light reaches the boundary between areas 11a and 11b shown in FIG. 7. When the image is written in the liquid crystal cells as in FIG. 1(A), an X-axis direction data writing signal S3, as it is, becomes R, G and B data writing signals S5, S6 and S7. Then, an R image is written in the liquid crystal cell 11 for a period when an R image data writing signal S5 and a Y-axis direction data writing signal S4 are HIGH. Similarly, G and B images are written, respectively, in the liquid crystal cells 12 and 13 for period when G and B image data writing signals S6, S7 and the Y-axis direction data writing signal S4 are HIGH.

Then, when the image is written in the liquid crystal cells as in FIG. 1(B), R, G and B development data writing position signals S8 through S10 are outputted counting an encoder output of the linear encoder motor 28a. In correspondence with it, R, G and B writing signals S11 through S13 are outputted.

Then, for a period when the signal S4 and signals S11 through S13 are HIGH, the R, G and B images are written in the liquid crystal cells 11 and 12.

When the image is written in the liquid crystal cells as in FIG. 1(C), R, G and B image data writing position signals S14 through S16 are outputted counting an encoder output of the rotary encoder motor 15, for writing three images per a single scanning line in a Y-direction, namely, the R, G and B images. In correspondence with it, the R, G and B image data writing signal S17 through S19 are outputted.

Figure 11:
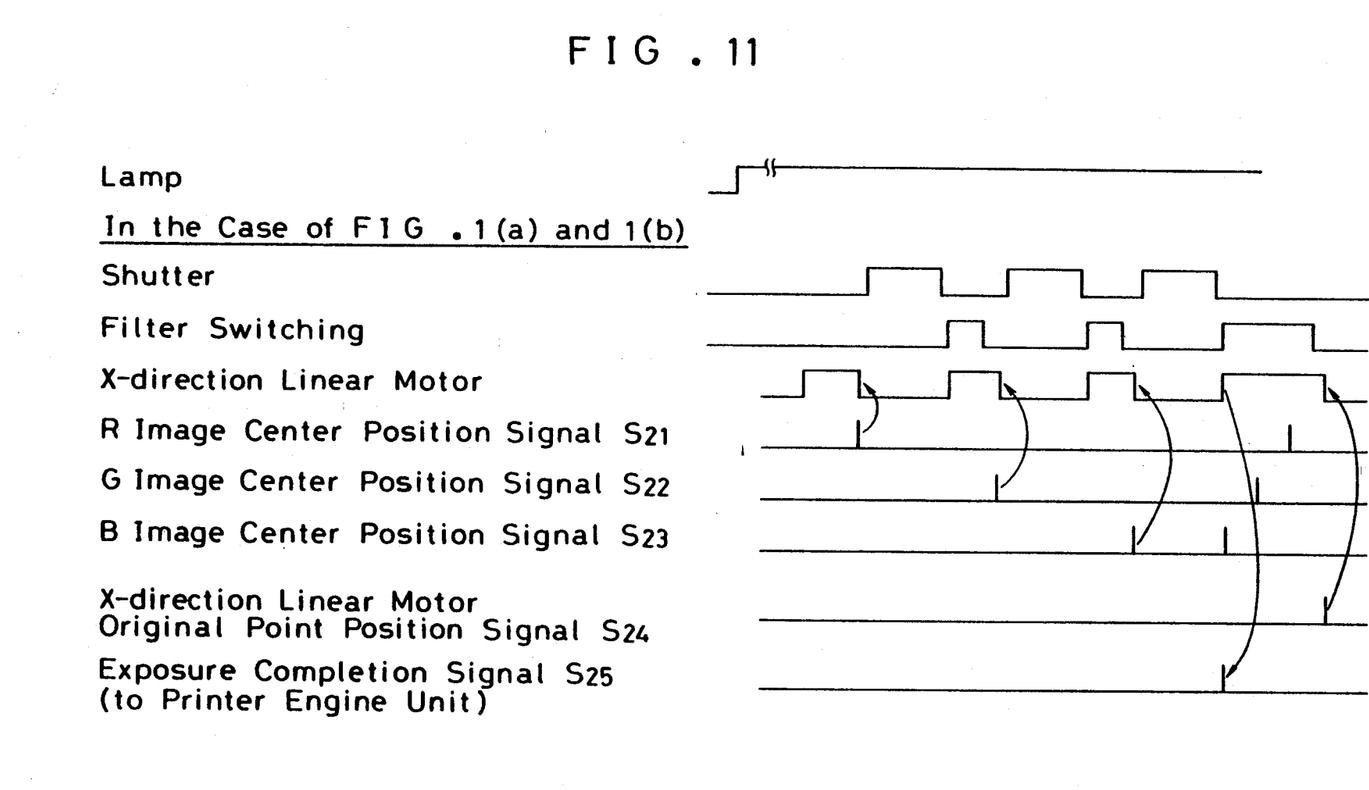
FIGS. 11 and 12 are timing charts showing the operation of reading from the liquid crystal cells.
Figure 12:
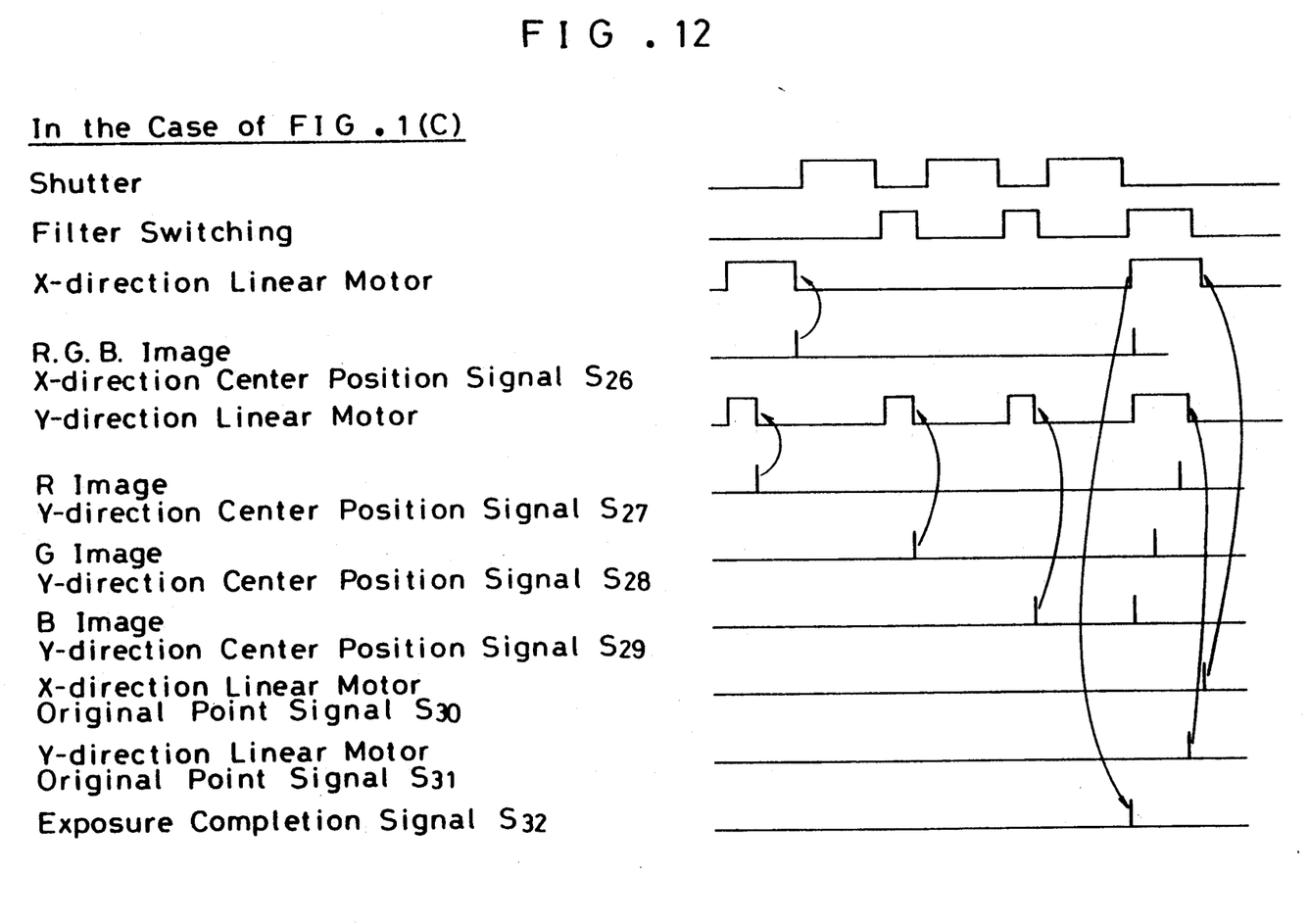

FIGS. 11 and 12 are timing charts for explaining the operation that the image written in the liquid crystal cells are transferred through an exposure to the photoconductive body 21.

At the time when the image writing is completed, the liquid crystal supporting unit 10 are returned to the original position, and then the lamp 18 is lighted and put in a sufficient stability.

First, when the images shown in FIGS. 1(A) and 1(B) are transferred through an exposure, as shown in FIG. 11, the linear encoder motor 28a in the X-axis direction is driven, the liquid crystal supporting unit 10 is moved from the original point in the X-axis direction, and the encoder output of the linear encoder motor 28a is counted. When the center of the R image lies on an optical axis of the lamp 18, a position signal S21 is outputted into the R image; the shutter 19a opens for a specified period of time to expose the R image of the liquid crystal cells through an R filter to a light of the lamp 18, and the reflected light is imaged on the photoconductive body 21. When an exposure of the R image is completed, the liquid crystal cells are moved in the X-axis direction, and the filter is switched to a G filter. When the center of the G image lies on the optical axis of the lamp 18, a signal 22 is outputted; for a specified period of time the shutter 19a opens to expose the G image. Similarly, when the center of the B image lies on the optical axis of the lamp 18, a signal 23 is outputted and the B image is exposed. When the exposure of the B image is completed, an exposure completion signal S25 is outputted, the linear encoder motor 28a makes a turn and the liquid crystal supporting unit 10 returns to the original position, and a signal 24 is outputted. The signals 24, 25 are used for a timing control of the photoconductive body 21 and the image receiving sheet 25.

Then, when the image shown in FIG. 1(C) is transferred through an exposure, as shown in FIG. 12, the linear encoder motors 28a, 29a are driven to move the liquid crystal supporting unit 10 in the X-axis and Y-axis directions; when the center of the R image lies on the optical axis of the lamp 18, the shutter 19a opens for a specified period of time to expose the R image. Then, the linear encoder 29a alone is driven to move the liquid crystal supporting unit 10 in the Y-axis direction; when the center of the G image lies on the optical axis of the lamp 18, the G image is exposed.

Then, the linear encoder motor 29a is driven again to move the liquid crystal supporting unit 10 in the Y-axis direction; when the B image lies on the optical axis of the lamp 18, the B image is exposed.

Then, the liquid crystal supporting unit 10 returns to the position of the original-point. Reference characters S26 denotes an X-axis direction center position signal of the R image, S27 denotes a Y-axis direction center position signal of the R image, S28 denotes a Y-axis direction center position signal of the G image, S29 denotes a Y-axis center position signal of the B image, S30 and S31 are original-point signals of the linear encoder motors 28a and 29a, and S32 is an exposure completion signal.

As has been described, according to the present invention, since a plurality of primary color images are written in a single optical image memory, the writing operation can be simplified and performed at higher speed than ever.

What is claimed is:

1. An image formation system comprising:
   image data outputting means for outputting three-primary-color image data for forming a full color image, and
   a printer for writing three images corresponding to the three-color image data in a single optical image memory by beam light to print the image out on a recording medium,
   said printer including, specifying means for specifying an arrangement of the three images to be written in said single optical image memory, and
   writing means for writing each primary color image into a separate storage region of said single optical image memory corresponding to the specified arrangement,
   said optical image memory being a memory where a stored image is optically recognizable and can be repetitively read out.

2. A system according to claim 1, wherein said writing means comprises a mirror directing beam light for reciprocally scanning said optical image memory and a shift mechanism for shifting said optical image memory in a direction perpendicular to a direction of the scanning.

3. A system according to claim 2, wherein said specifying means specifies an arrangement of a plurality of primary-color-images in a direction of the scanning.

4. A system according to claim 2, wherein said specifying means specifies an arrangement of a plurality of primary-color-images in a direction perpendicular to the direction of the scanning by said mirror.

* * * * *